United States Patent
Armacost et al.

(10) Patent No.: US 10,369,685 B2
(45) Date of Patent: Aug. 6, 2019

(54) SPRING COMPRESSOR AND METHOD OF USE THEREOF

(71) Applicant: HONDA MOTOR CO., LTD., Minato-ku, Tokyo (JP)

(72) Inventors: James Armacost, New Castle, IN (US); Terry Castle, Greensburg, IN (US); Nicholaus Rosswurm, Batesville, IN (US)

(73) Assignee: HONDA MOTOR CO., LTD., Tokyo (JP)

( * ) Notice: Subject to any disclaimer, the term of this patent is extended or adjusted under 35 U.S.C. 154(b) by 476 days.

(21) Appl. No.: 15/041,970

(22) Filed: Feb. 11, 2016

(65) Prior Publication Data

US 2017/0232596 A1    Aug. 17, 2017

(51) Int. Cl.
*B25B 27/30* (2006.01)
*B62D 65/12* (2006.01)

(52) U.S. Cl.
CPC ............ *B25B 27/304* (2013.01); *B62D 65/12* (2013.01); *B60G 2206/921* (2013.01)

(58) Field of Classification Search
CPC .. B25B 27/304; B62D 65/12; B60G 2206/921
USPC ..................... 280/124.164, 124.168, 124.179
See application file for complete search history.

(56) References Cited

U.S. PATENT DOCUMENTS

| | | | |
|---|---|---|---|
| 3,051,443 A | 8/1962 | Castoe | |
| 3,067,500 A | 12/1962 | Bliss | |
| 3,128,542 A * | 4/1964 | Strawn | B25B 27/304 29/227 |
| 3,764,107 A | 10/1973 | Mlynarczyk | |
| 4,034,960 A * | 7/1977 | Kloster | B25B 27/304 254/10.5 |
| 4,036,473 A | 7/1977 | Kloster | |
| 4,813,119 A * | 3/1989 | Vanbeber | B25B 27/304 29/402.08 |
| 5,954,314 A | 9/1999 | Weisshaar | |
| 6,616,126 B1 | 9/2003 | Barrios et al. | |
| 7,103,951 B2 | 9/2006 | Uzun | |
| 7,284,309 B2 | 10/2007 | Park | |
| 7,814,629 B2 | 10/2010 | Uzun | |
| 7,909,305 B2 | 3/2011 | Helwick | |

(Continued)

FOREIGN PATENT DOCUMENTS

FR    2989611 A1 * 10/2013    ........... B25B 27/304

*Primary Examiner* — Faye M Fleming
(74) *Attorney, Agent, or Firm* — Arent Fox LLP

(57) ABSTRACT

A spring compressor including a first mating arm in configured to mate with a subframe component of a vehicle, a second mating arm configured to mate with a moveable suspension component of the vehicle, wherein the suspension arm carries a suspension spring, and an actuator configured move the second mating arm toward the first mating arm to compress the suspension spring, so as to facilitate installation of a part, such as a damper. The disclosure also provides a method of joining a damper or similar part with a suspension component, such as a suspension arm, and with a body portion of the vehicle, including mating the first mating arm with the subframe component, mating the second mating arm with the suspension component, actuating the actuator to move the second mating arm toward the first mating arm so as to move the suspension arm, and securing the damper to the vehicle.

18 Claims, 13 Drawing Sheets

(56) References Cited

U.S. PATENT DOCUMENTS

| | | |
|---|---|---|
| 8,191,862 B2 | 6/2012 | Arabian |
| 8,590,127 B2 | 11/2013 | Bergholz et al. |

* cited by examiner

SPRING COMPRESSOR AND METHOD OF USE THEREOF

BACKGROUND

Aspects of the present disclosure relate generally to an apparatus for compressing a spring, for example a suspension spring, damper, or other similar feature (e.g., a strut or shock absorber) of a vehicle. Aspects of the present disclosure also relate generally to a method of assembling a damper or other similar device with a vehicle, such as during a vehicle manufacturing process or repair.

A step in manufacturing a vehicle may include joining a damper to the body, frame component, and/or suspension component of the vehicle, and in particular, joining a rear damper within a wheel well of the body. The step may include bolting the damper to suspension and/or body portions within the wheel well. In some vehicle configurations, it may be difficult to bolt the damper to such suspension and/or body portions because a spring of the rear suspension biases the suspension at a distance from the body portion to which the damper is to be attached. In some instances, this distance may be too far for an operator to readily bolt the damper at both ends.

Spring compressor apparatuses are known, which directly engage the spring of the suspension for compression purposes, for example, so as to enable installation of shock absorbers or struts, or the like. However, such spring compressor apparatuses are not capable of moving the damper itself sufficiently close to the necessary attachment points so as to easily allow bolting of the damper to both the suspension and the body portion.

Thus, there is an unmet need in the art for a damper installation device capable of compressing a suspension spring and moving the damper to a position so as to allow installation thereof.

SUMMARY

According to one aspect, the disclosure provides a spring compressor, comprising: a first mating arm configured to mate with a subframe component of a vehicle; a second mating arm configured to mate with a moveable suspension component of the vehicle when the first mating arm is mated with the subframe component, wherein the moveable suspension component carries a suspension spring; and an actuator configured to move the second mating arm toward the first mating arm so as to compress the suspension spring when the first mating arm is mated with the subframe component and the second mating arm is mated with the moveable suspension component.

In another aspect, the disclosure provides a method of securing a vehicle part between a moveable suspension component and a body portion of a vehicle, the method comprising: mating a first mating arm of a spring compressor with a subframe component of the vehicle; mating a second mating arm of the spring compressor with a moveable suspension component of the vehicle, wherein the moveable suspension component carries a suspension spring; actuating an actuator of the spring compressor to move the second mating arm toward the first mating arm, wherein moving the second mating arm toward the first mating arm compresses the suspension spring and moves the moveable suspension component; and securing the vehicle part between the moveable suspension component and a body portion of the vehicle. The vehicle part may include a damper, a shock absorber, strut, or other similar device. For example, the vehicle part may include a piston which moves inside a sealed, oil-filled cylinder. Such dampers and similar components may be selected from a number of types (e.g., basic two-tube, twin-tube gas charged, position sensitive, acceleration sensitive, and coilover, as well as monotube).

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

Figure 1:
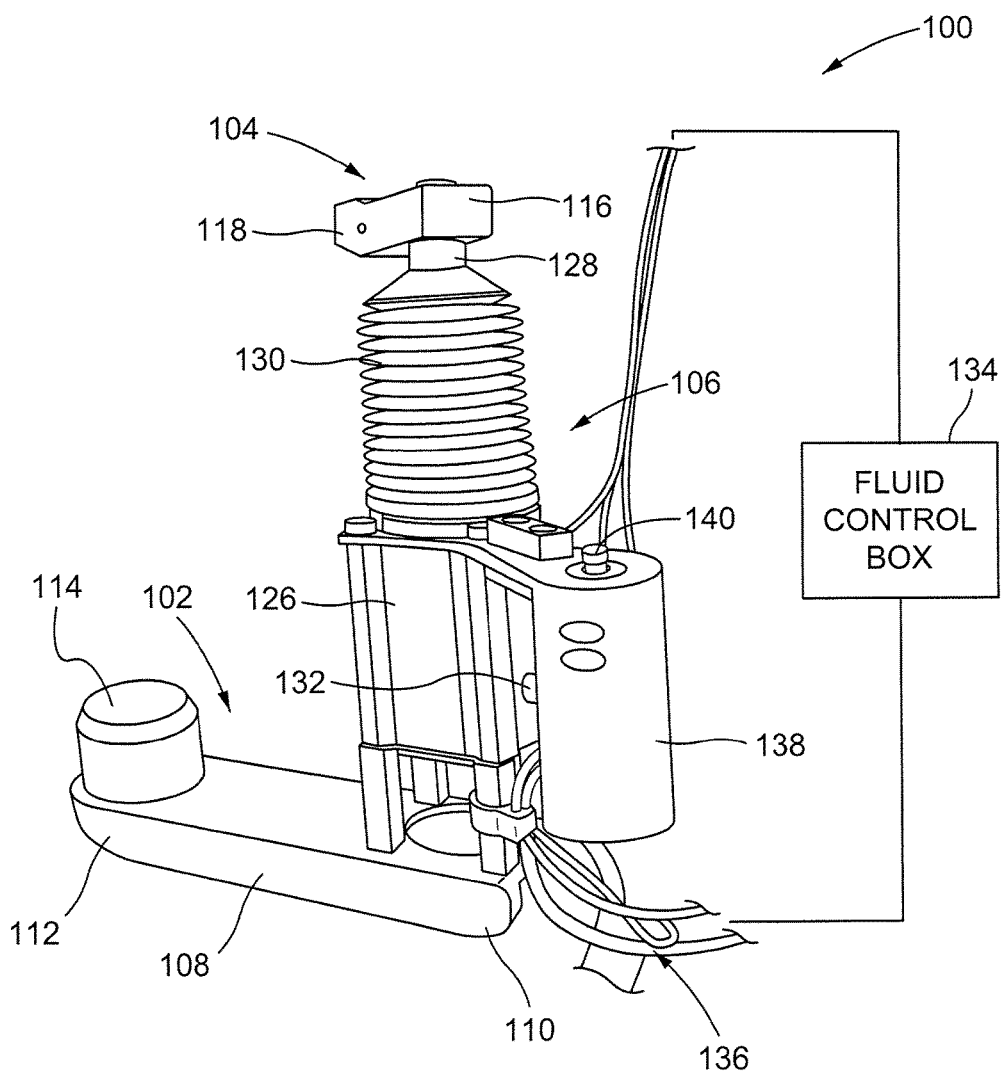
FIG. 1 show a perspective view of a spring compressor in an extended orientation, in accordance with aspects of the present invention.
Figure 4:
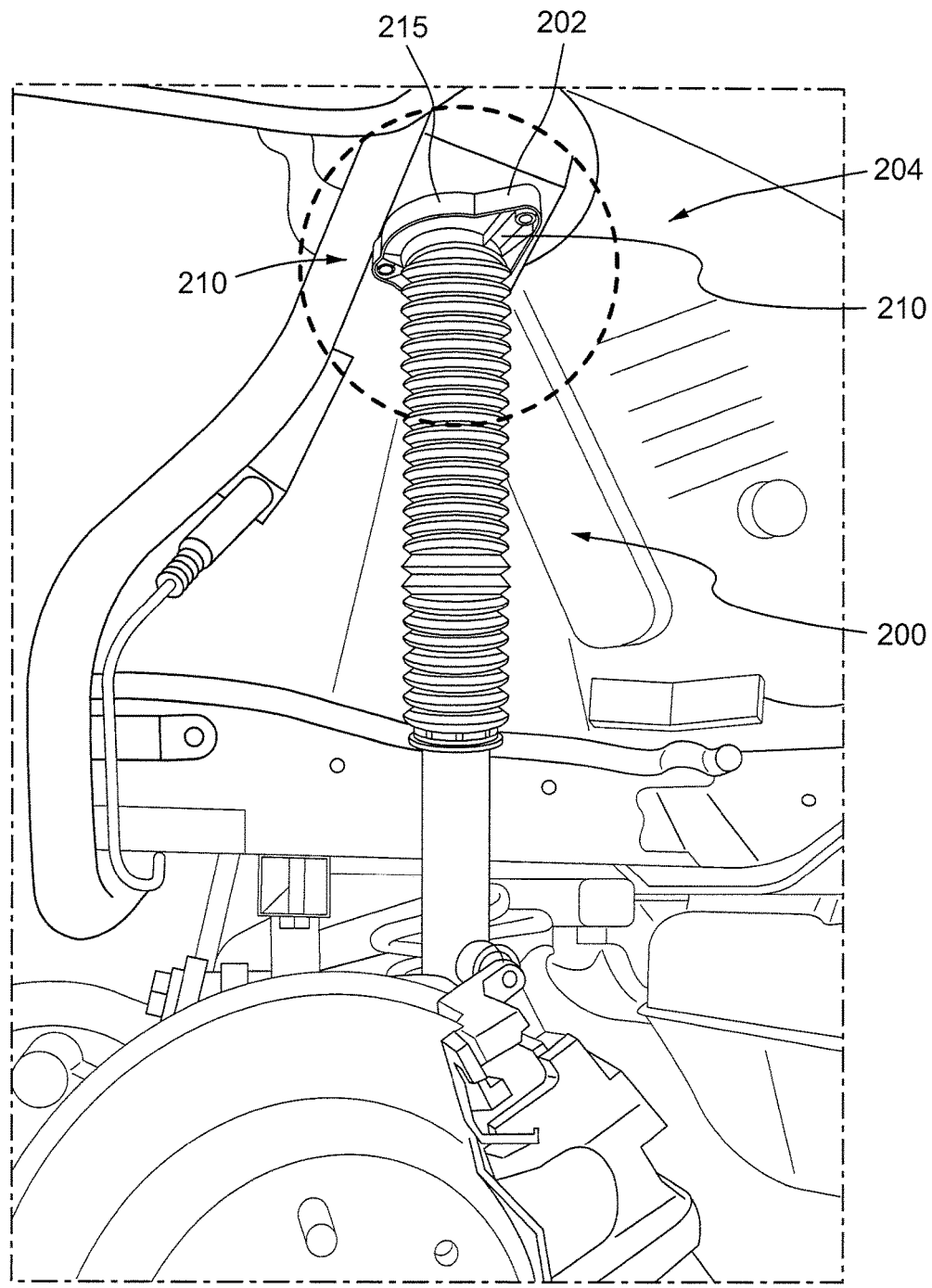
FIG. 4 is a perspective view of an underside of a partially assembled vehicle with a damper located at a distance from a body portion of the vehicle, in accordance with aspects of the present invention.
Figure 12:
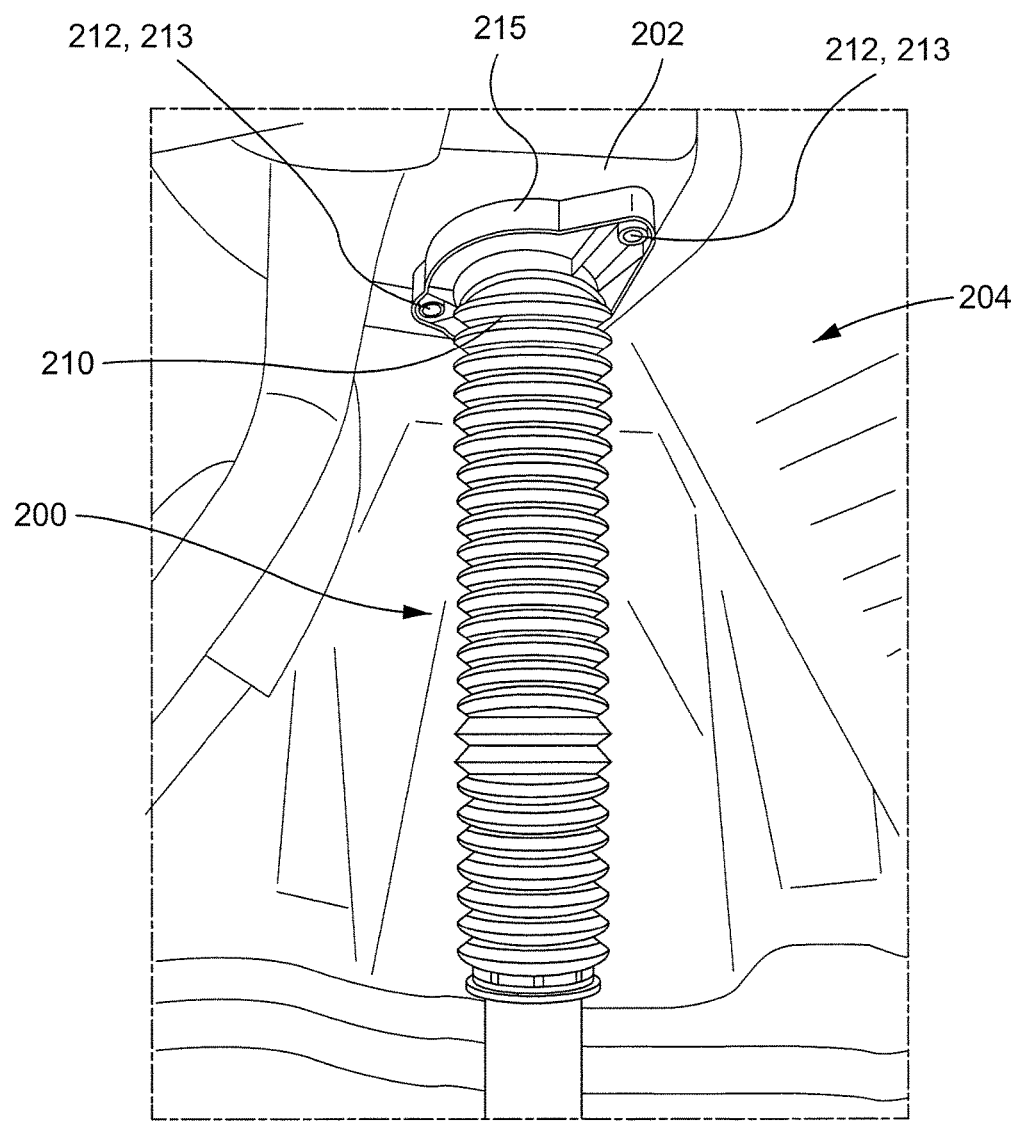
Figure 13:
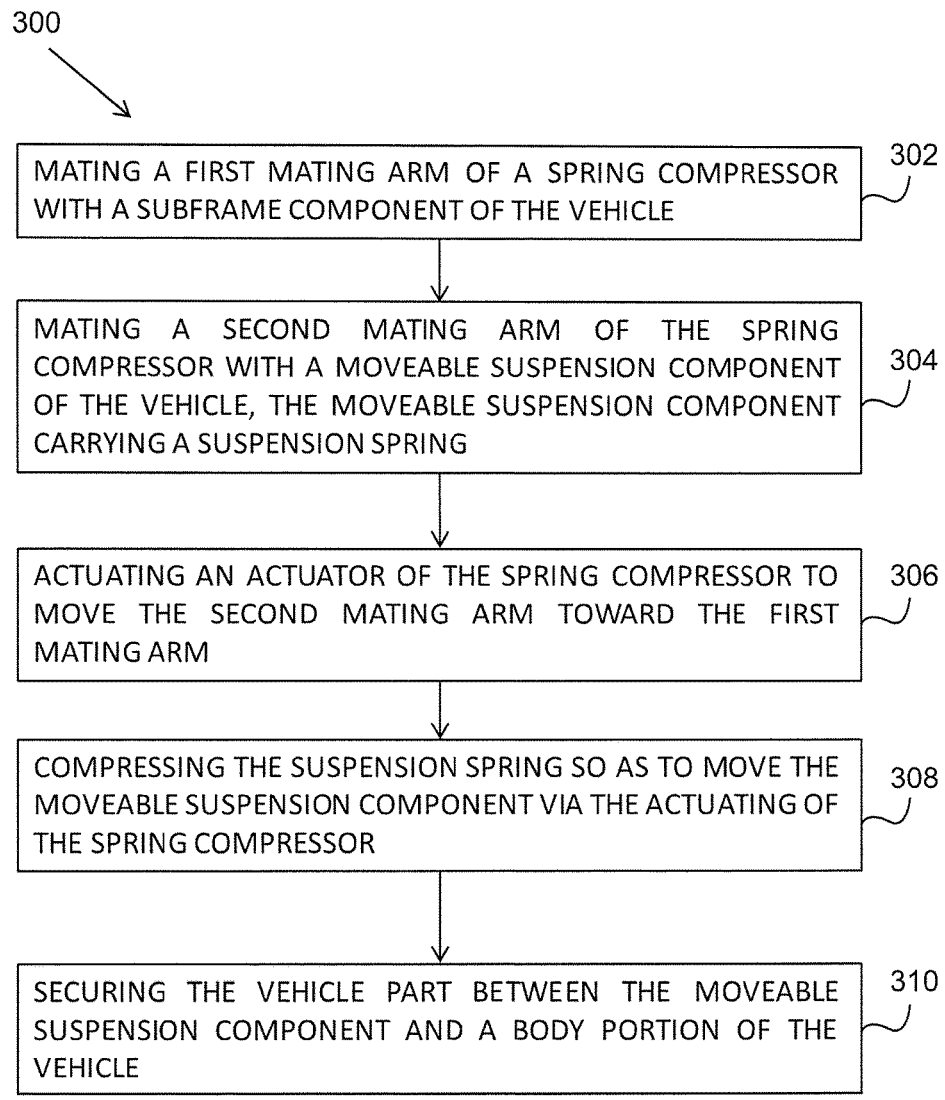

FIG. 12 is a close up view of a portion of the damper if FIG. 4 when the spring compressor of FIG. 1 is mated with the vehicle and in the retracted orientation, in accordance with aspects of the present invention; and FIG. 13 is a flowchart illustrating a method of joining the damper of FIG. 4 to a wheel well of the partially assembled vehicle, in accordance with aspects of the present invention.

DETAILED DESCRIPTION

According to one aspect, the disclosure provides a spring compressor, comprising: a first mating arm configured to mate with a subframe component of a vehicle; a second mating arm configured to mate with a moveable suspension component of the vehicle when the first mating arm is mated with the subframe component, wherein the moveable suspension component carries a suspension spring; and an actuator configured to move the second mating arm toward the first mating arm so as to compress the suspension spring when the first mating arm is mated with the subframe component and the second mating arm is mated with the moveable suspension component.

In another aspect, the disclosure provides a method of securing a vehicle part between a moveable suspension component and a body portion of a vehicle, the method comprising: mating a first mating arm of a spring compressor with a subframe component of the vehicle; mating a second mating arm of the spring compressor with a moveable suspension component of the vehicle, wherein the moveable suspension component carries a suspension spring; actuating an actuator of the spring compressor to move the second mating arm toward the first mating arm, wherein moving the second mating arm toward the first mating arm compresses the suspension spring and moves the moveable suspension component; and securing the vehicle part between the moveable suspension component and a body portion of the vehicle.

Referring now to the drawings, what is shown therein is for purposes of illustrating one or more example aspects of the disclosure, and not for purposes of limiting the same.

Figure 2:
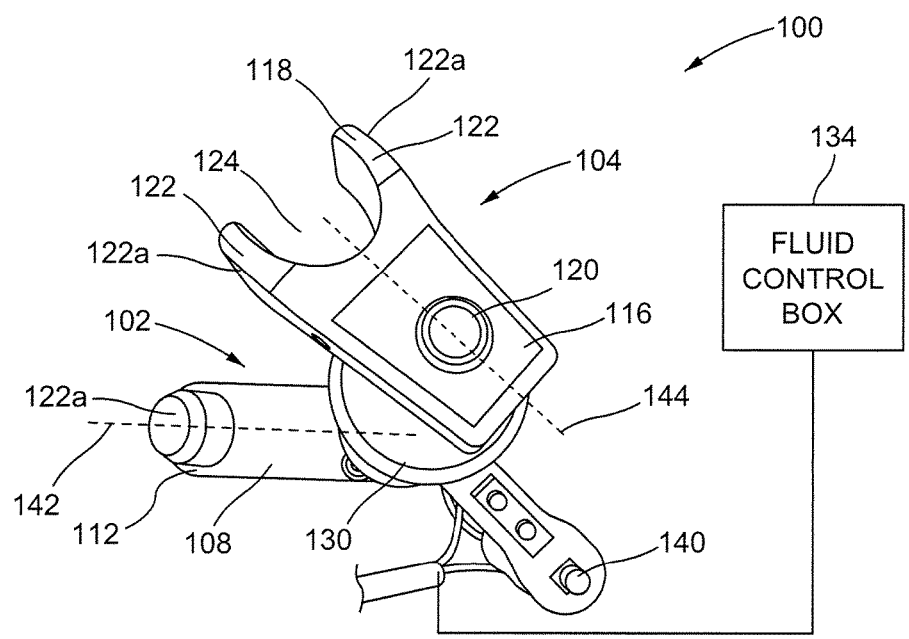
FIG. 2 is a top view of the spring compressor of FIG. 1 in accordance with aspects of the present invention.
Figure 3:
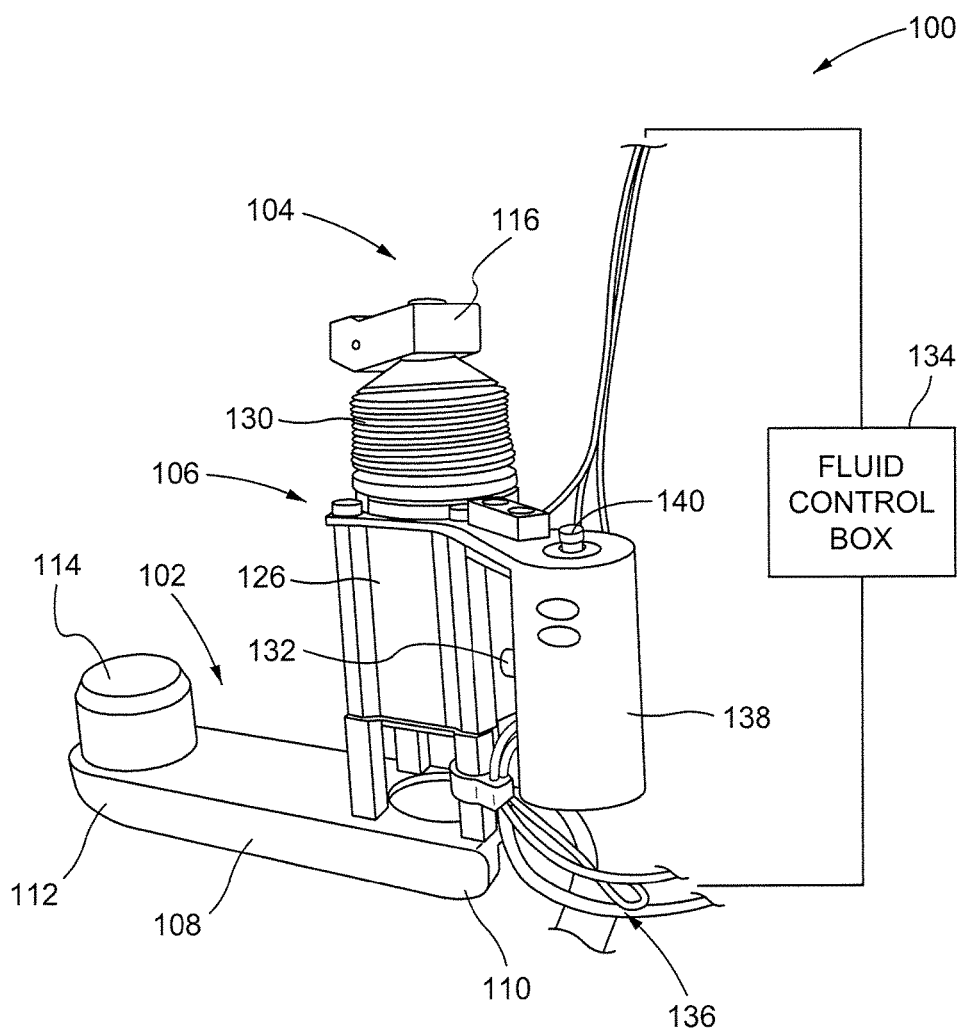
FIG. 3 is a perspective view of the spring compressor of FIG. 1 in a retracted orientation, in accordance with aspects of the present invention.

FIGS. 1-3 show an example spring compressor 100 in accordance with aspects of the present invention. FIGS. 1 and 2 show the spring compressor 100 in a partially extended, non-compressed state, while FIG. 3 shows the spring compressor 100 in a retracted, compressed state. As shown in FIGS. 1-3, the spring compressor 100 may include a first mating arm 104, a second mating arm 102, and an actuator 106. The second mating arm 102 may be configured to mate with moveable suspension component, such as a suspension spring seat 219 (FIG. 6) of a suspension lower arm 217 (FIGS. 6, 9, 10, 11) of a vehicle. The first mating arm 104 may be configured to mate with a subframe component 214 (FIGS. 6-8, 11) of the vehicle. Such subframe component 214 may include, for example, a box-shaped or otherwise cross-sectionally shaped cross frame member in the suspension subframe. The mating of the second mating arm 102 and the first mating arm 104 with the vehicle is described in more detail below. Upon actuation, the actuator 106 may be configured to compressively move the second mating arm 102 toward first mating arm 104, for example, when the first mating arm 104 is mated with the subframe component 214, which is also discussed below in more detail.

Figure 6:
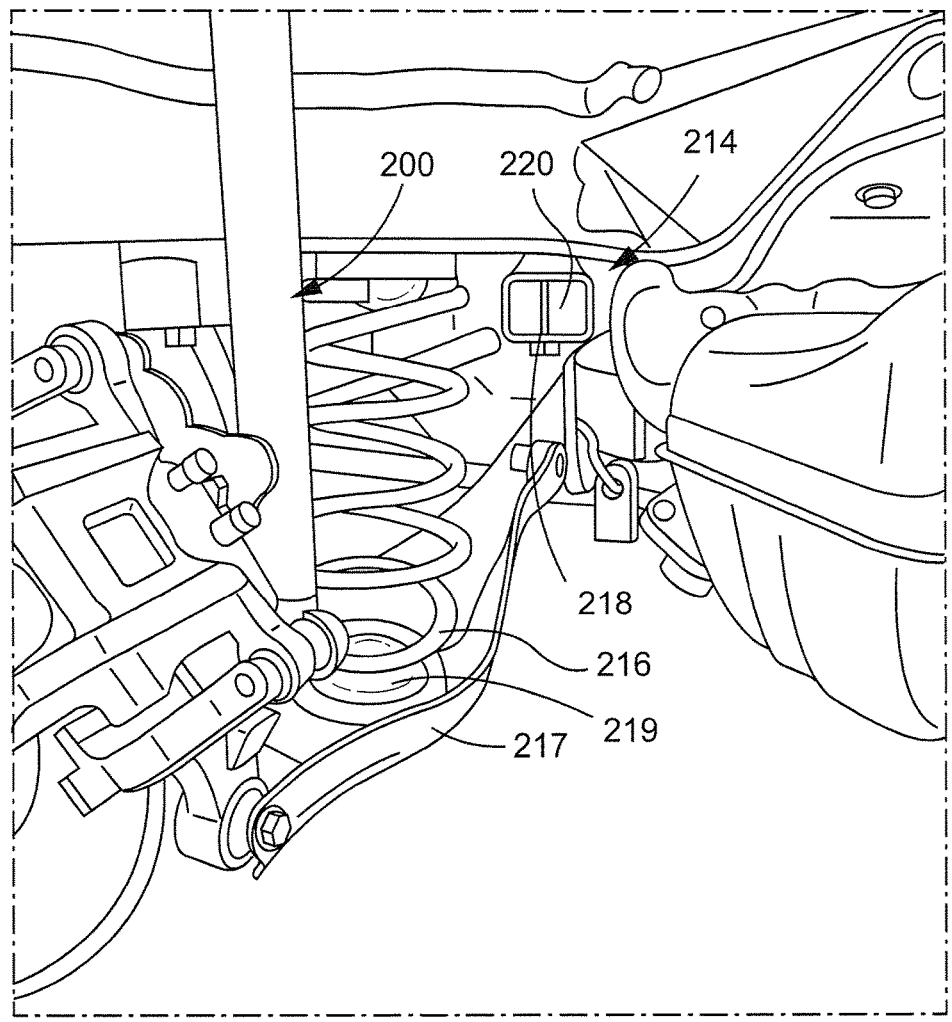
FIG. 6 is a perspective view of the partially assembled vehicle of FIG. 4 prior to mating the spring compressor of FIG. 1 with the vehicle, in accordance with aspects of the present invention.
Figure 10:
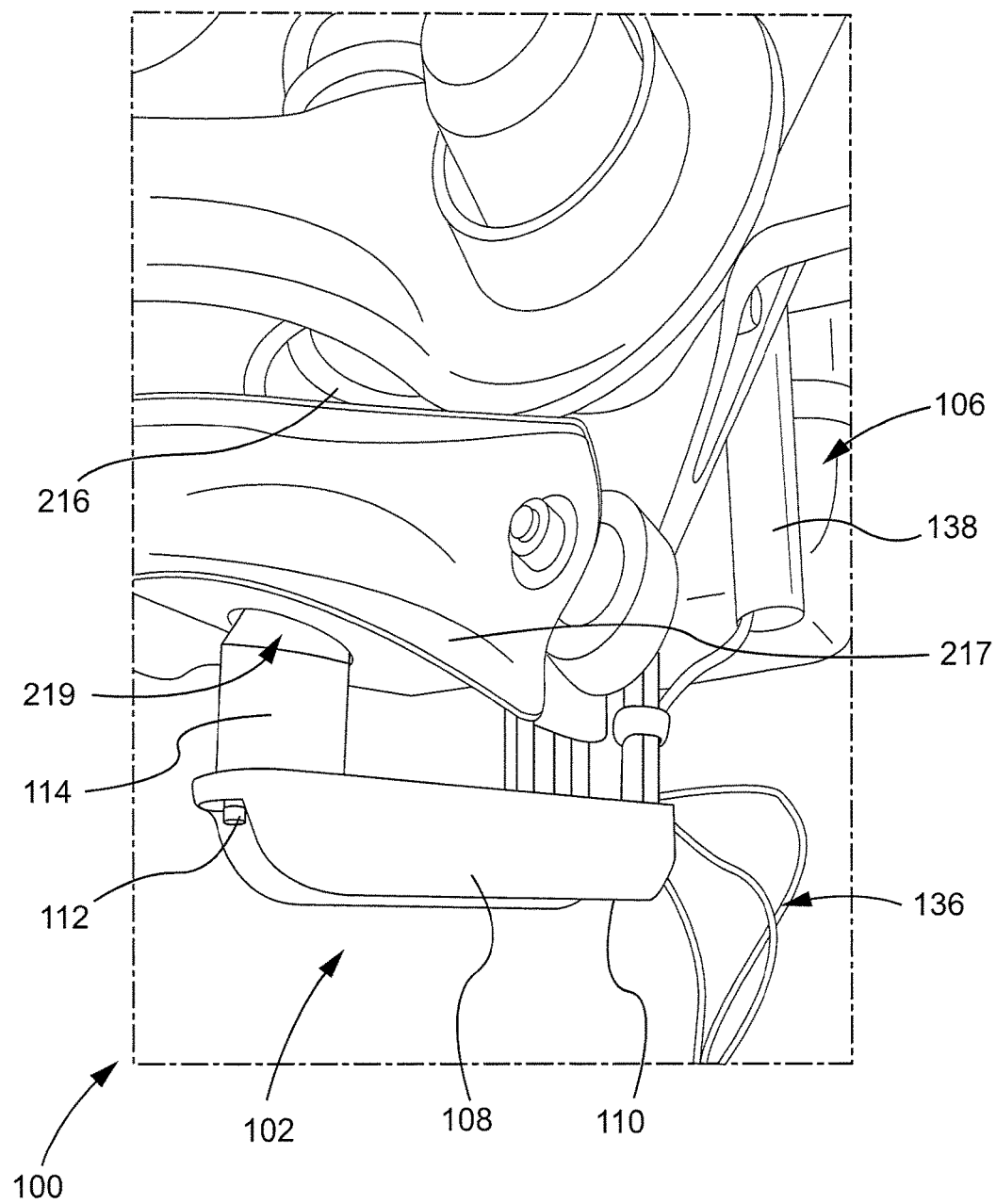
FIG. 10 is a another perspective view of the partially assembled vehicle of FIG. 4 with the spring compressor of FIG. 1 mated to the vehicle, the spring compressor being in an extended orientation, in accordance with aspects of the present invention.

The second mating arm 102 may comprise an extending member 108 having a first end 110 connected to the actuator 106 and a free end 112. The free end 112 of the extending member 108 of the second mating arm 102 may include a projection member 114. The projection member 114 may extend substantially perpendicularly/upwardly (e.g., as shown in FIG. 1) from the extending member 108. The projection member 114 may be sized and shaped to fit within the suspension spring seat 219 of the suspension lower arm 217 of the vehicle (see, e.g., FIGS. 6 and 10). For example, the suspension spring 216 (e.g., FIG. 6) of the vehicle may be a coil spring having a substantially cylindrical outer shape. As shown in FIG. 6, the suspension spring 216 may be coupled with a suspension spring seat 219 that extends upwardly from the suspension lower arm 217. As shown in FIG. 10, the projection member 114 may have a shape at least partially congruent to the inner diameter of the suspension spring seat 219, such that the projection member 114 is capable of at least partially entering into the suspension spring seat 219 (e.g., with a friction fit). Thus, the particular dimensions of the projection member 114 may correspond with (and/or be varied for) the shape of the particular suspension spring seat 219 with which the spring compressor 100 is being used. Alternatively, the projection member 114 may have an overall shape that allows mating with differing sizes of suspension spring seats 219. For example, the projection member 114 may have an end cone shape that enables mating with multiple different size suspension spring seats 219. The mating of the second mating arm 102 with the moveable suspension component is discussed in more detail below.

Figure 8:
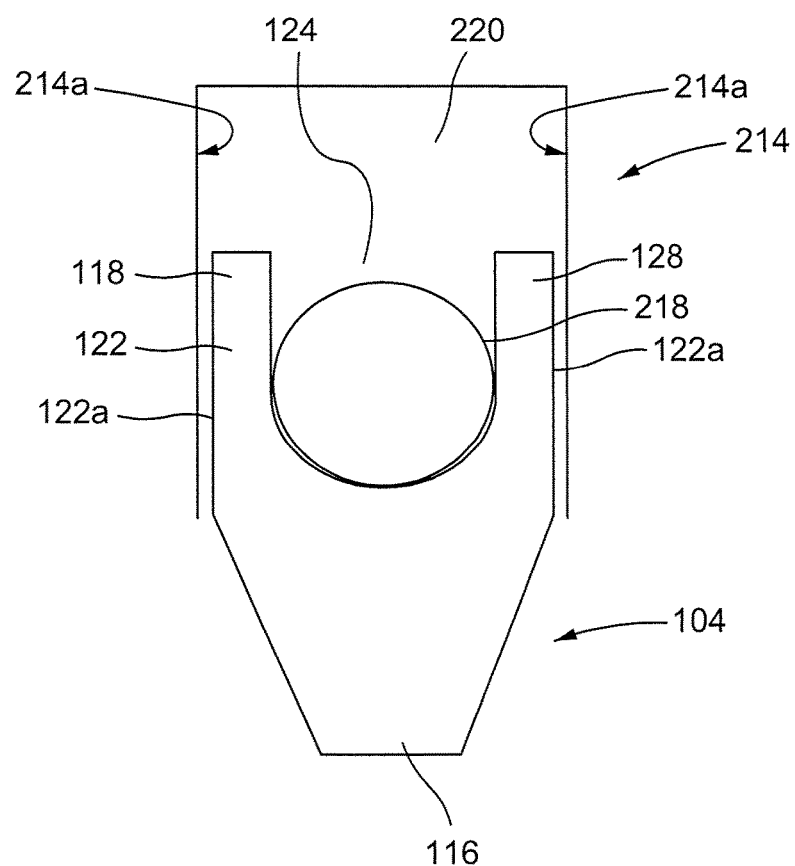
FIG. 8 is a top schematic view of the spring compressor of FIG. 1 mated to a subframe component of the partially assembled vehicle of FIG. 4 in accordance with aspects of the present invention.

As shown in FIG. 2, the first mating arm 104 may comprise a first end 116 connected to or otherwise engaged with an end of the actuator 106 and a free end 118. The first end 116 may be connected to the end of the actuator 106 via a connector 120 such as a nut/bolt, screw, nail, or the like. In one example, aspect, the actuator 106 comprises a rod 128 (FIG. 1), and the connector 120 may be physically connected to an end of the rod 128 (FIG. 1), such as via a screw fitting (e.g., connector 120 has a threaded end that is received in a threaded opening in the end of the rod 128, or vice versa); the connector 120 may also be connected to the rod 128 by other suitable features and/or mechanisms, such as an interference fit. The free end 118 of the first mating arm 104 may be sized and shaped to mate with the subframe component 214 (see, e.g., FIG. 6). For example, as shown in FIG. 2, the free end 118 may include one or more engaging portions 122 configured to fit within the partially encircle and/or grip a bolt 218 (FIG. 6; also shown in cross section in FIG. 8) extending through a hollow inner portion of the subframe component 214. As shown in FIG. 2, the engaging portion 118 may include opposing arms 122 defining a receiving area 124, and the opposing arms 122 may have outer edges 122a. The outer edges 122a of the opposing arms 122 may also or alternatively be spaced apart, for example, so as to be received within the subframe component 214 (FIG. 8) with a friction fit (e.g., relative to walls 214a of subframe component 214, as shown in FIG. 8).

As yet another alternative (not shown), the first mating arm 104 may be sized and shaped so as to mate with (e.g., securely grip) the outer surface of the subframe component 214.

As shown in FIG. 1, the actuator 106 may comprise any suitable device that allows for relative movement of second mating arm 102 toward the first mating arm 104. In an aspect, the actuator 106 may be a fluid power device, such as a pneumatic cylinder or a hydraulic cylinder. For example, the actuator 106 may comprise a cylinder (e.g., within block 126) and a rod 128 received within or otherwise engaged with the cylinder (e.g., via a piston attached to the end of the rod opposite the end attached to the first mating arm 104), such that when pressurized fluid, such as liquid or gas, is forced into or withdrawn from the cylinder, the rod 128 movement caused to move (e.g., extend or retract) along its axial direction. The actuator may include compressible bellows 130 extending around the rod 128, for example, so as to protect the rod from corrosion and/or interference from foreign bodies (e.g., dirt and dust). The rod 128 may be connected to the first mating arm 104 as described above.

As shown in FIG. 3, the actuator 106 may further include a first fluid inlet/outlet port 132 and/or a second inlet/outlet port 133 (FIG. 9) in communication with the cylinder inside of the block 126. The fluid inlet/outlet ports 132, 133 may be in communication with a control box 134 (e.g., shown in representative form in FIG. 1, such control box including, for example, a source of fluid, such as an air or hydraulic reservoir, which may be stored in pressurized form, and/or the fluid may be pressurized by another device, such as a pump, e.g., a compressor) via a plurality of fluid delivery tubes 136 (FIG. 1).

Figure 9:
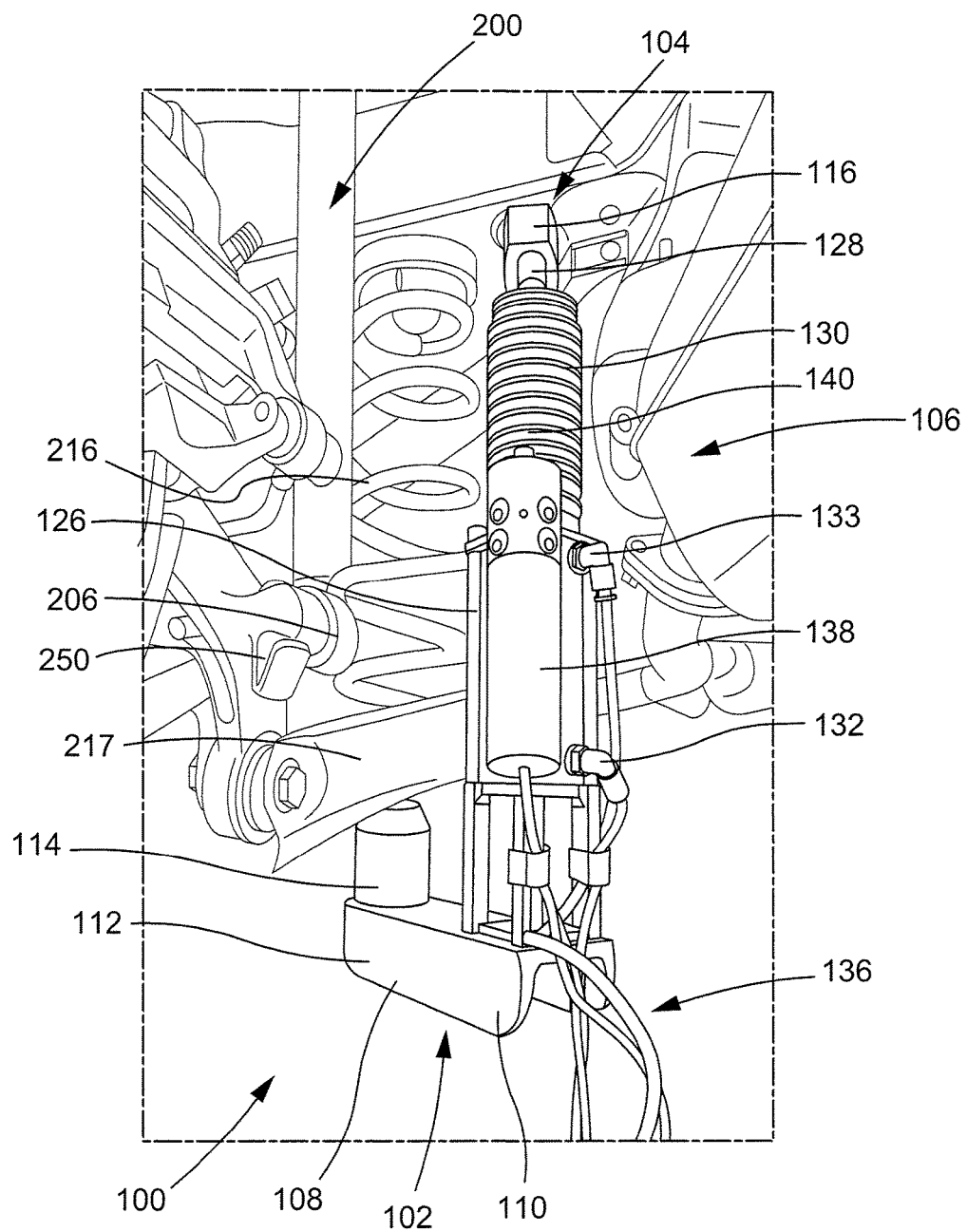
FIG. 9 is a another perspective view of the partially assembled vehicle of FIG. 4 with the spring compressor of FIG. 1 mated to the vehicle, the spring compressor being in an extended orientation, in accordance with aspects of the present invention.

As shown in FIG. 9, movement of the second mating arm 102 relative to the rod 128 may be achieved through conventional pneumatic/hydraulic operation. For example, when it is desired to translate the second mating arm 102 upwardly as shown in FIG. 9 (i.e., in the upward direction toward the first mating arm 104), so as, for example, to thereby drive suspension lower arm 217 upward, fluid may be pumped or allowed to pass in pressurized form through the appropriate tube or tubes 136, through the inlet/outlet port(s) 132, 133, so as to produce such motion. Because the rod 128 has a fixed/stationary position relative to the vehicle when the first mating arm 104 is mated with the subframe component 214, as discussed in more detail below, the second mating arm 102 will move upwardly with retraction of the rod 128, as shown in FIG. 9. When it is desired to translate the second mating arm 102 downwardly (i.e., away from the second mating arm 104, as shown in FIG. 9), fluid may be directed through the appropriate tube or tubes 136, through the inlet/outlet port(s) 132, 133, with extension of the rod 128. FIG. 1 shows the spring compressor 100 when the cylinder is partially extended, and FIG. 3 shows the spring compressor 100 when the cylinder is fully retracted. While a fluid powered device has been described, the relative movement may be provided by other methods, for example, via a turnscrew driven by a motor.

Figure 7:
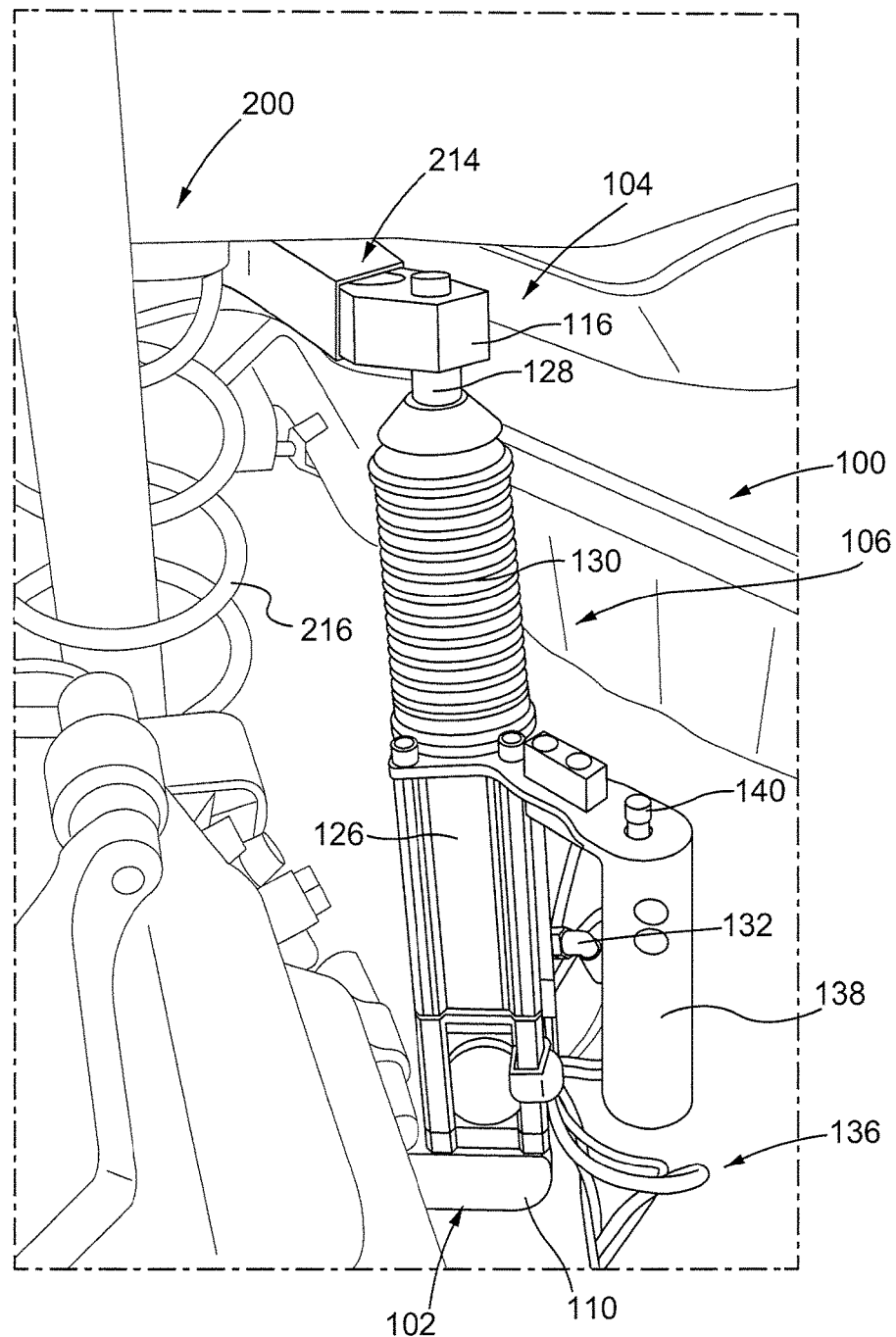
FIG. 7 is a perspective view of the partially assembled vehicle of FIG. 4 with the spring compressor of FIG. 1 mated with the vehicle, the spring compressor being in an extended orientation, in accordance with aspects of the present invention.

In one example implementation, as shown in FIG. 3, the spring compressor 100 may further include a handle 138 coupled with the block 126. The handle 138 may extend from the block 126 to allow the operator to manipulate and operate the spring compressor 100. The handle 138 may include a button or trigger 140, which, when actuated, may cause the control box 134 to deliver or withdraw fluid through the appropriate tube or tubes 136 so as to move the second mating arm 102 from the expanded to the retracted position and vice versa. The button or trigger 140 may be operatively coupled with the control box 134, such as via an electrical connector or wireless coupling, for example, whereby engagement of the button or trigger 140 will cause appropriate operation of the control box 134. For example, starting from an extended position of the second mating arm 102 relative to the first mating arm 104, as shown in FIG. 7, when the operator presses or otherwise engages the button 140, the control box 134 may receive a signal and deliver fluid to the cylinder so as to retract the rod 128. Such retraction may be continued, for example, until the cylinder retracts the second mating arm 102 to the position shown in FIG. 3 (or to another stop position, such as the position shown in FIG. 11, as described further below). Similarly, when starting from the position shown in FIG. 3 (or FIG. 11), when the operator presses or otherwise engages the button 140, the control box 134 may receive a signal and deliver fluid so as to extend the second mating arm 102 via the rod 128, such that the cylinder translates to the spring compressor 100 to the position shown, for example, in FIG. 1. The button 140 may be located on the handle 138, as shown in FIG. 3, such that when the operator grips the handle 138 the operator's thumb or a finger is readily positioned for ease of actuation.

The extending member 108, the block 126, the handle 138, the rod 128, and the cylinder may be made of any material of suitable strength, for example aluminum, steel, wood, plastic, and/or the like. The material may be the same or a similar material as the body of the vehicle, for example. The projection member 114 may be made of the same material, but preferably is made from a plastic or similar material have a sufficient durometer to avoid scratching the suspension lower arm 217, while providing a durable friction fit. For example, the projection member 114 may be made from nylon.

Figure 5:
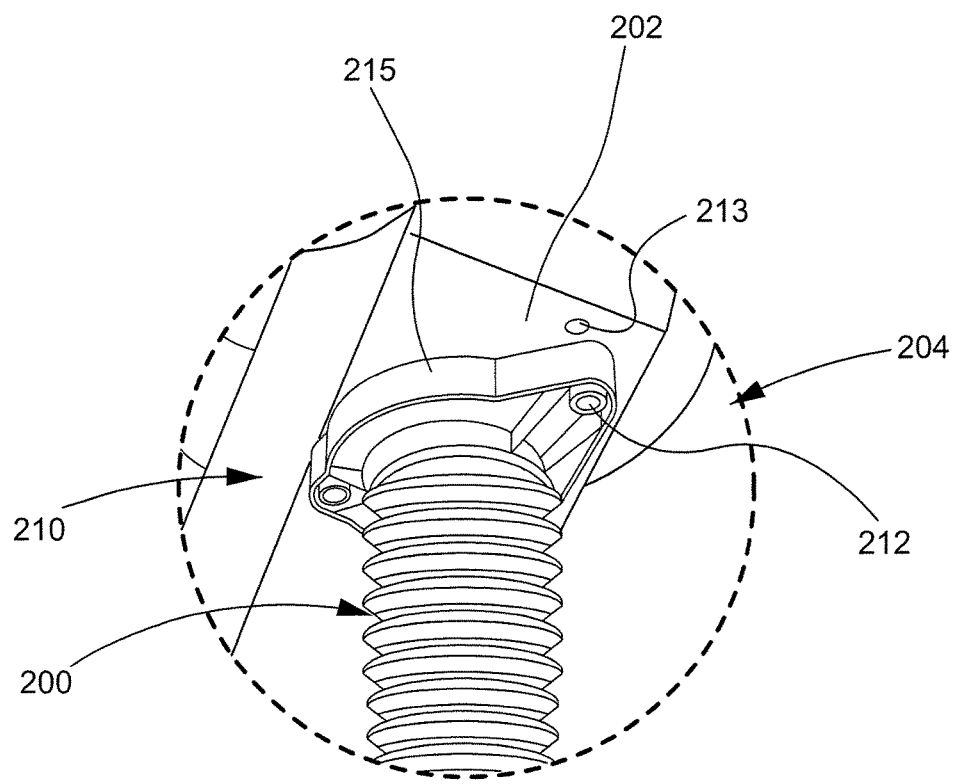
FIG. 5 is a close up view of a portion of the damper of FIG. 4 located at distance from the body portion of the vehicle, in accordance with aspects of the present invention.

With reference to FIGS. 4-13, operation of the spring compressor 100 to attach an example damper 200 to an example inner surface 202 of a wheel well 204 portion of a vehicle body will be described. FIG. 13 shows a flowchart of the method 300. FIGS. 4-6 show a view of the underside of a partially assembled vehicle with a damper 200 shown attached at a lower end to a suspension component, such as a lower suspension arm 217, prior to attaching the damper 200 to an attachment point on the inner surface 202 of the wheel well 204. As seen in FIG. 9, prior to using the spring compressor 100, a first end 206 of the damper 200 may be first coupled to the suspension component 217, such as via another component 250.

Furthermore, prior to using the spring compressor 100, a second end 210 of the damper 200 may be spaced (see, e.g., FIGS. 4 and 5) from an attachment point, for example, on the inner surface 202 of the wheel well 204. Such attachment point may alternatively be located at other locations, depending on the application. For example, the attachment point may be located within a trunk portion or body interior portion of the vehicle. More particularly, in the example implantation as shown in FIGS. 4 and 5, a bracket 215 of the damper having bolt holes 212 is located at a distance from corresponding bolt receiving openings 213 in the wheel well 204. In this position, because of the space between the bracket 215 and the inner surface 202, the operator cannot easily attach the damper 200 to the inner surface 202 via the bolt holes 212 and openings 213.

FIG. 6 shows the underside of the partially assembled vehicle, including a subframe component 214 and a suspension spring 216. The subframe component 214 may include an attachment feature for attaching the component 214 to the vehicle body, such as a bolt 218 passing through a hollow inner portion 220. As shown in FIG. 6, the spring compressor 100 has not yet been mated with the subframe component 214. FIG. 7 shows the underside of the partially assembled vehicle, with the spring compressor 100 in process of being mated with the subframe component 214 and suspension component 214 (FIG. 6), prior to actuation of the spring compressor 100. Prior to actuation, the spring compressor 100 may be in the expanded orientation also shown in FIG. 7. As shown in FIG. 7, a portion of the first mating arm 104 may be inserted into the hollow portion 220 of the subframe component 214, as shown in the variation of FIG. 7. For example, the opposing arms 122 (FIG. 2) of the first mating arm 104 may be inserted into the hollow portion 220 (FIG. 7) of the subframe component 214, such that the opposing arms 122 (FIG. 2) grip or otherwise surround the bolt 218 (FIG. 6) passing through the hollow portion 220 (FIG. 6). The opposing arms 122 (FIG. 2) may be configured to provide a friction around the bolt 218 (and/or, for example, a ring or other feature extending about the bolt 218 of FIG. 6), such that the first mating arm 104 is fixedly secured to the subframe component 214.

The mating of the first mating arm 104 with the subframe component 214 is shown schematically in FIG. 8. As shown in FIG. 8, the inner portion of the arms 122 may encompass the bolt 218, and the bolt 218 may include a ring or other feature about the bolt 218 so as to enable a frictional or other fit of the first mating arm 104 relative to the bolt 218 and/or ring or other extending feature. Alternatively, or in addition to such fit of the arms 122 relative to the bolt 218 and/or other surrounding feature to the bold 218, the outer portions 122*a* of the arms 122 may also frictionally or otherwise engage the inner surfaces 214*a* of the subframe component 214, as shown in f FIG. 8.

Now referring to FIG. 13, the above description may serve as an example implementation of a first step or act of mating a first mating arm of a spring compressor with a suspension component of a vehicle 302 as shown in the flowchart 300 of FIG. 13.

Figure 11:
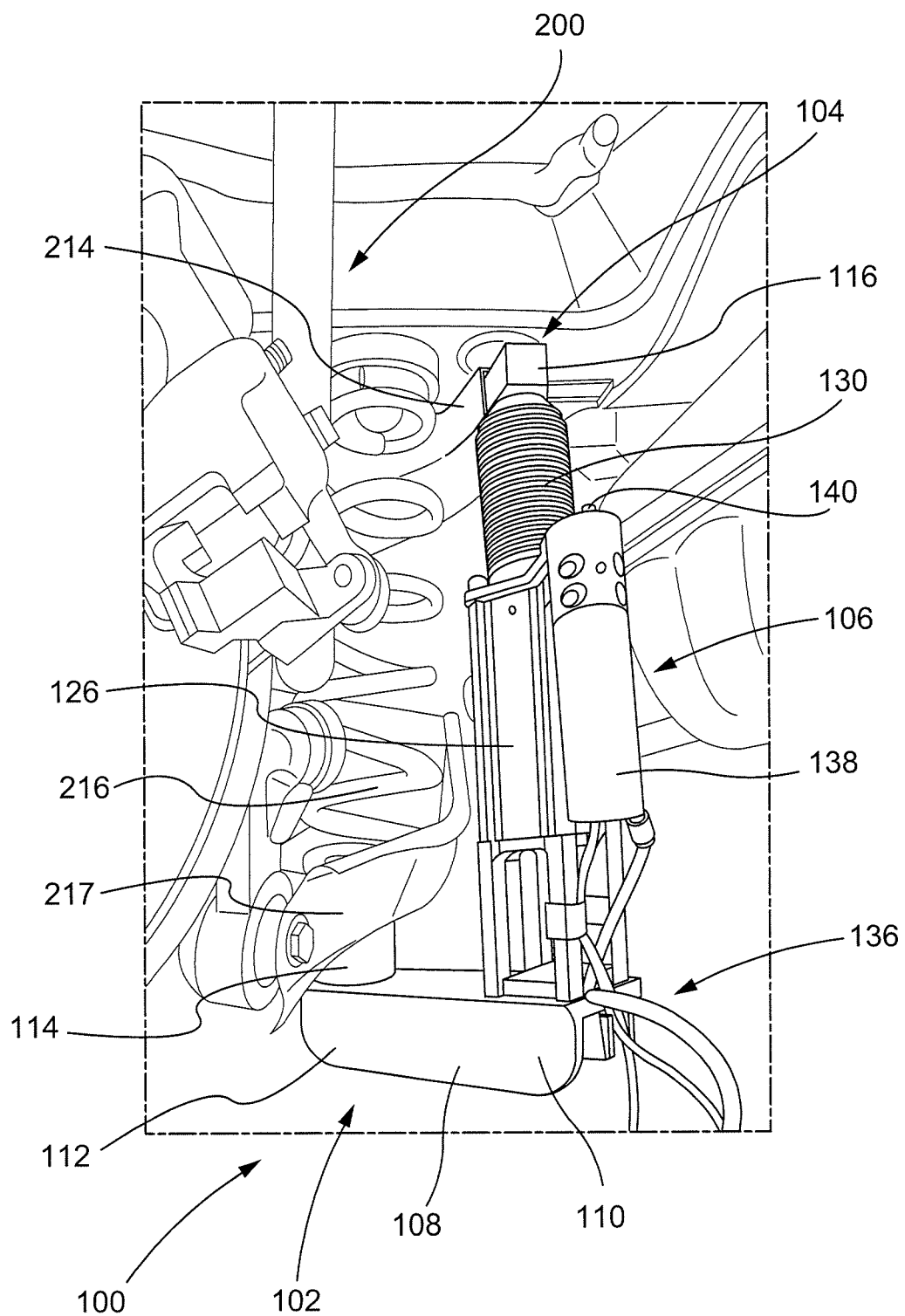
FIG. 11 is a perspective view of the partially assembled vehicle of FIG. 4 with the spring compressor of FIG. 1 mated to the vehicle, the spring compressor being in a retracted orientation, in accordance with aspects of the present invention.

As shown in FIG. 9, the angle of extension relative to the block 126/rod 128 and length of the extending member 108 of the second mating arm 102 may be selected such that, when the first mating arm 104 is mated with the subframe component 214, the free end 112 of the second mating arm 102 is positioned for easy engagement with the of the spring seat 219 of the suspension lower arm 217. More particularly, for the example implementation shown in FIG. 9, the angle/direction of extension and length of extending member 108 may be selected such that when the opposing arms 122 of the first mating arm 104 are engaged with the bolt 218, the projection member 114 is aligned for engagement with the spring seat 219 of the suspension lower arm 217. For example, as shown in FIG. 2, the angle between a longitudinal center line 142 of extending member 108 and a longitudinal center line 144 of the first mating arm 104 may be about 30 degrees to about 70 degrees, more preferably about 40 degrees to about 60 degrees for the example implementation shown in FIGS. 4-7 and 9-12. Because the suspension spring 216 is coupled with the spring seat 219, the projection member 114 may similarly be aligned with the inside of the suspension spring 216 defined by the coils. FIGS. 10 and 11 show perspective views of the underside of the partially assembled vehicle in which the first mating arm 104 is mated with the subframe component 214 (FIG. 11) and the projection member 114 is aligned with spring seat 219 (FIG. 10) and also aligned with the suspension spring 216. FIG. 9 shows a moment in time just prior to actuating the spring compressor 100, where the spring compressor 100 is in the extended orientation. As best seen in FIG. 10, at the point just before the compressor is extended, the projection member 114 is aligned with underside of the spring seat 219 of the suspension lower arm 217 and is also aligned with the inside of the suspension spring 216.

Now referring again to FIG. 13, the above description may serve as an example implementation of a second step or act of aligning a second mating arm of the spring compressor with a suspension component of the vehicle, the suspension component carrying a suspension spring 304 as shown in the flowchart 300 of FIG. 13.

With the spring compressor 100 as shown in FIG. 10 in the appropriate location, the operator may then press the button 140 (FIG. 7) to actuate the actuator 106. Pressing the button 140 (FIG. 7) may send a signal to the fluid control box 134 (FIG. 1) to deliver fluid via tube or tubes 136 to/from the cylinder via the inlet/outlet port(s) 132, 133 (FIG. 9). The control box 134 (FIG. 1) may be pre-configured to provide the necessary amount of fluid to create an amount of pressure sufficient to move the cylinder relative to the rod 128 (FIG. 9) so as to overcome the bias force of the suspension spring 216. Because the first mating arm 104 is mated with the subframe component 214, and the subframe component 214 remains stationary relative to the vehicle body, the first mating arm 104 remains in a fixed relative to the vehicle body. The first mating arm 104 in turn being coupled with the rod 128 (FIG. 9) results in the rod 128 (FIG. 9) being unable to move downwardly as shown in FIG. 9 (e.g., axially toward the second mating arm 102) within the cylinder. The second mating arm 102, aligned with the spring seat 219 and the suspension spring 216 such that the projection member 114 extends into the spring seat 219, is not fixed due to the compressibility of suspension spring 216. Thus, pressurizing the cylinder with fluid through inlet/outlet ports 132/133 (FIG. 9) will cause the cylinder, along with the block 126 and the second mating arm 102, to move upwardly as shown in FIG. 11, toward the first mating arm 104, thereby applying compressive force on suspension spring 216. The actuator 106 may be configured to deliver sufficient force to overcome enough of the spring force of the suspension spring 216 to compress the suspension spring 216 and lift suspension lower arm 217 the distance necessary, for example, to enable attachment of the damper 200 at the attachment point on the inner surface 202 of the wheel well 204 (FIGS. 4 and 5).

Referring again to FIG. 13, the above description may serve as an example implementation of a third step or act of actuating an actuator of the spring compressor to move the second mating arm toward the first mating arm 306, as well as the fourth step or act of thereby compressing the suspension spring so as to move a damper or other similar device to a location enabling attachment of the damper or other similar device to the vehicle body 308 as shown in the flowchart 300 of FIG. 13. The spring compressor 100 is configured such that once the actuator 106 is actuated and the damper is in a position where it can be attached to the vehicle body 308, the operator no longer needs to hold the spring compressor 100. The operator can then use both hands to perform a subsequent assembly step, for example, coupling the damper to the vehicle body 308.

FIG. 11 shows the underside of the partially assembled vehicle and the spring compressor 100 after actuation. FIG. 12 shows the second end 210 of the damper 200 including the bracket 215 after actuation of the spring compressor 100 (FIG. 11). As shown in FIG. 11, in the compressed state of the spring compressor 100, the second mating arm 102, including the projection member 114, along with the block 126, have moved upwardly as shown in FIG. 11 relative to the position shown in FIGS. 9 and 10. As shown in FIG. 11, in this position, the suspension spring 216 has been compressed sufficiently to allow the bracket 215 (FIG. 12) to be positioned against or flush with the inner surface of 202 of the wheel well 204 (see FIG. 12). Furthermore, the bolt holes 212 of the bracket 215 of the damper 200 are aligned and flush with the bolt holes 213 of the inner surface 202 of the wheel well 204.

With the bolt holes 212, 213 aligned and the bracket 215 sufficiently close to the inner surface 202 of the wheel well 204, the operator is able to let go of the spring compressor 100. The operator is able to then insert the bolts through the bolt holes, thereby securely bolting the damper 200 to the wheel well 204. The bolting may be performed with a bolt gun or any other suitable device.

Referring again to FIG. 13, the above description may serve as an example implementation of a fifth step or act of securing the bracket of the damper or other similar device to the attachment point of the vehicle body 310 as shown in the flowchart 300 of FIG. 13

Once the bolting operation is complete, the operator may then reverse the above spring compressor 100 (FIG. 9) actuation steps. For example, the operator may press the button 140 (FIG. 7), which may reverse the fluid pressure in the cylinder relative to the operation shown in FIGS. 9-11 and described with respect thereto. For example, pressing the button 140 (FIG. 7) may actuate the actuator 106 (FIG. 11) to cause the fluid control box 134 (FIG. 1) to remove the pressurized fluid from one of the inlet/outlet ports 132, 133 via a tube or tubes 136 (FIG. 9). At the same time, the fluid control box 134 may direct fluid into one of the inlet/outlet ports 132, 133, so as to cause the cylinder, along with the block 126 and the second mating arm 102, to move downwardly as shown in FIG. 11, away the first mating arm 104, thereby releasing the compressive force on suspension spring 216. With force no longer being applied to the suspension lower arm 217 via the second mating arm 102, the natural bias force of the suspension spring 216 will move the suspension lower arm 217 back to its original position. In another aspect of the present invention, pressurized fluid may not need to be directed into the cylinder via one of the inlet/outlet ports 132, 133. Rather, the fluid control box 134 may merely remove the fluid from the cylinder via opening of the corresponding one of the inlet/outlet ports 132, 133, which may result in removal of the fluid by virtue of release of the force on the suspension lower arm 217. In this case, the natural bias force of the suspension spring 216 may push the cylinder, the block 126, and the second mating arm 102 including the projection member 114 downwardly, thereby driving out the fluid. Once the spring compressor 100 has been expanded, the operator may remove the spring compressor 100 and repeat the above steps as needed to install another damper or other similar device.

While the above example method discusses manual operation of the spring compressor 100 and manually bolting the damper or other similar device 200 to the vehicle body, the process may be fully automated. For example a computer controller may be used to control operation of robot arms that perform all of the above steps.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A spring compressor, comprising:
a first mating arm configured to mate with a subframe component of a vehicle;
a second mating arm configured to mate with a moveable suspension component of the vehicle when the first mating arm is mated with the subframe component, wherein the moveable suspension component carries a suspension spring; and
an actuator configured to move the second mating arm toward the first mating arm so as to compress the suspension spring when the first mating arm is mated with the subframe component and the second mating, arm is mated with the moveable suspension component, wherein the first mating arm comprises opposing arms defining a receiving area configured to mate with the subframe component.

2. The spring compressor of claim 1, wherein the opposing arms are configured to mate with a bolt of the subframe component.

3. The spring compressor of claim 1, wherein the actuator comprises a rod coupled with the first mating arm.

4. The spring compressor of claim 1, wherein the second mating arm comprises:
a first end coupled with the actuator;
a second end opposite the first end; and
a projection member extending from the second end.

5. The spring compressor of claim 4, wherein the when the first mating arm is mated with the subframe component, the projection member is aligned with a spring seat of the moveable suspension component.

6. The spring compressor of claim 1, wherein the actuator is a fluid actuator that comprises:
a cylinder;
a rod operatively coupled with the cylinder;
an inlet/outlet port in communication with the cylinder; and
a fluid supply tube in communication with the inlet/outlet port and in communication with a fluid control box.

7. A spring compressor, comprising:
a first mating arm configured to mate with a subframe component of a vehicle;
a second mating arm configured to mate with a moveable suspension component of the vehicle when the first mating arm is mated with the subframe component, wherein the moveable suspension component carries a suspension spring;
an actuator configured to move the second mating arm toward the first mating arm so as to compress the suspension spring when the first mating arm is mated with the subframe component and the second mating arm is mated with the moveable suspension component; and
a button on the spring compressor configured to actuate the actuator.

8. The spring compressor of claim 1, wherein when the actuator compresses the suspension spring, the moveable suspension component moves relative to a body of the vehicle, thereby enabling installation of a part therebetween.

9. The spring compressor of claim 8, wherein the part is a damper.

10. The spring compressor of claim 1, wherein the subframe component comprises a cross member.

11. The spring compressor of claim 1, wherein the moveable suspension component comprises a lower suspension arm.

12. A method of securing a vehicle part between a moveable suspension component and a body portion of a vehicle, the method comprising:
mating a first mating arm of a spring compressor with a subframe component of the vehicle, wherein the first mating arm is connected to an actuator of the spring compressor via a rod and wherein the mating of the first mating arm with the subframe component comprises preventing axial movement of the rod;

mating a second mating arm of the spring compressor with a moveable suspension component of the vehicle, wherein the moveable suspension component carries a suspension spring;

actuating an actuator of the spring compressor to move the second mating arm toward the first mating arm, wherein moving the second mating arm toward the first mating arm compresses the suspension spring and moves the moveable suspension component; and securing the vehicle part between the moveable suspension component and a body portion of the vehicle.

13. The method of claim 12, wherein the first mating arm comprises opposing arms defining a receiving area, and wherein the mating of the first mating arm with the subframe component further comprises mating the opposing arms with the subframe component.

14. The method of claim 12, wherein the second mating arm comprises:

a first end coupled with the actuator;

a second end opposite the first end; and a projection member extending from the second end.

15. The method of claim 14, wherein the mating of the first mating arm with the subframe component further comprises aligning the projection member with a spring seat of the moveable suspension component.

16. The method of claim 12, further comprising actuating the actuator to move the second mating arm away from the first mating arm after securing the vehicle part.

17. The method of claim 12, wherein the spring compressor comprises a handle having a button, the method further comprising pressing the button to actuate the actuator.

18. The method of claim 12, wherein the vehicle part is a damper.

* * * * *